(12) United States Patent
Huesmann et al.

(10) Patent No.: US 12,398,289 B2
(45) Date of Patent: Aug. 26, 2025

(54) ELECTROCOAT COMPOSITION

(71) Applicant: AXALTA COATING SYSTEMS IP CO., LLC, Wilmington, DE (US)

(72) Inventors: Thomas Huesmann, Solingen-Gräfrath (DE); Konstantinos Markou, North Rhine Westfalia (DE); Tim Koesterke, North Rhine Westfalia (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 1022 days.

(21) Appl. No.: 17/132,944

(22) Filed: Dec. 23, 2020

(65) Prior Publication Data

US 2021/0238439 A1    Aug. 5, 2021

Related U.S. Application Data

(60) Provisional application No. 62/955,088, filed on Dec. 30, 2019.

(51) Int. Cl.

| | | |
|---|---|---|
| *C09D 129/04* | (2006.01) | |
| *C08K 3/36* | (2006.01) | |
| *C09D 5/44* | (2006.01) | |
| *C09D 7/20* | (2018.01) | |
| *C25D 13/06* | (2006.01) | |
| *C08K 5/00* | (2006.01) | |

(52) U.S. Cl.
CPC .............. *C09D 129/04* (2013.01); *C08K 3/36* (2013.01); *C09D 5/4407* (2013.01); *C09D 5/4492* (2013.01); *C09D 7/20* (2018.01); *C25D 13/06* (2013.01); *C08K 5/0025* (2013.01)

(58) Field of Classification Search
CPC ...... C09D 129/04; C09D 7/20; C09D 5/4407; C09D 5/4492; C09D 163/00; C08K 3/36; C08K 5/0025; C25D 13/06; C25D 13/22; B05D 7/576; B05D 1/007; C08G 59/50; C08L 2666/16; Y10S 524/901
See application file for complete search history.

(56) References Cited

U.S. PATENT DOCUMENTS

| | | | |
|---|---|---|---|
| 5,104,583 A | 4/1992 | Richardson | |
| 5,178,736 A | 1/1993 | Richardson | |
| 5,203,975 A * | 4/1993 | Richardson | .......... C09D 5/4492 204/501 |
| 6,235,812 B1 | 5/2001 | Reuter et al. | |
| 6,951,602 B1 | 10/2005 | Reuter et al. | |
| 2014/0190836 A1 | 7/2014 | Gebregiorgis | |
| 2017/0335120 A1 | 11/2017 | Gelling | |

FOREIGN PATENT DOCUMENTS

| | | |
|---|---|---|
| CN | 1226913 A | 8/1999 |
| CN | 101568608 A | 10/2009 |
| CN | 106413920 A | 2/2017 |
| JP | H0339370 A | 2/1991 |
| WO | 9309191 A1 | 5/1993 |
| WO | 9318099 A1 | 9/1993 |
| WO | 2009154832 A1 | 12/2009 |
| WO | 2014074234 A1 | 5/2015 |

* cited by examiner

*Primary Examiner* — Xiuyu Tai
(74) *Attorney, Agent, or Firm* — Ingrassia Fisher & Lorenz, LLP

(57) ABSTRACT

Aqueous electrocoat compositions having improved throwing power and methods for coating electrically conductive substrates are provided. An exemplary composition includes water, a crosslinkable resin including a binder and a crosslinking agent, and a pigment paste. The exemplary electrocoat composition has a pigment/binder (P/B) ratio of less than about 0.15:1.

16 Claims, No Drawings

ELECTROCOAT COMPOSITION

CROSS-REFERENCE TO RELATED APPLICATIONS

This application is related to and claims all available benefit of U.S. Provisional Patent Application 62/955,088 filed Dec. 30, 2019, the entire contents of which are herein incorporated by reference.

TECHNICAL FIELD

The technical field generally relates to electrocoat compositions for coating substrates.

BACKGROUND

Electrodeposition coating, also known as electrocoating or e-coating, is a well-known process for coating the surface of electrically conducting articles. The process is used to coat objects made of metal, especially for the priming of automobile bodies, or else to coat conductive plastics. The coating that is formed is a layer or film that may be referred to as an electrocoat or e-coat.

The coating materials used in electrodeposition coating generally comprise amino or carboxyl-containing synthetic resin binders, with dispersibility in water being achieved by neutralization of the amino or carboxyl groups. The electrodeposition coating materials may further include special grinding resins and possibly further constituents not dispersible in water, such as polymers, plasticizers, pigments, fillers, additives, and auxiliaries. The crosslinking agents used in the electrodeposition coating materials either are not dispersible in water or may be water-dispersible, with the electrodeposition coating materials being externally crosslinking or else self-crosslinking, or being curable with condensation.

Modification to the binders, selection of the crosslinkers, and variation of the composition of the ingredients of the electrodeposition coating material influence the properties of the coating, such as corrosion protection, adhesion, and leveling, for example. For instance, there have been disclosures in particular of electrodeposition coating materials where polymer microparticles or suspended and/or dispersed polymer powders are added to improved corrosion protection, especially at edges. Further, water-soluble polyvinyl alcohol (co)polymer or of a mixture of polyvinyl alcohol (co)polymers have been used as an additive in aqueous electrodeposition coating baths to improve electrocoating performance.

There is increasing demand for low density or non-settling electrocoating composition systems. Lower material densities lead to a significant reduced consumption and less demand for bath circulation due to lower tendency for sedimentation. Yet, low density and non-settling systems often are found to have a negative influence on throwing power and other properties. Thus, there is a conflict with the demand for compact systems with higher focus on overall appearance.

There is also a desire for an electrocoat process that requires fewer sanding operations and dirt avoidance. Therefore, modern electrocoating processes have been designed as upside down processes (Rodip/E-shuttle/Varioshuttle) in order to avoid a sedimentation on horizontals like automotive components such as the bonnet, roof and trunk lid. Also, there is a demand for higher turnover rates, such as between four to six hours to avoid gas surface defects with significant influence on energy consumption for the stronger bath circulation.

Common electrocoat systems use high bath solids and strong acids (low pka values) like sulfamic acid, nitric acid and methane sulfonic acid in order to achieve appropriate throwing power or hyper throw capability. However, strong neutralizing agents significantly increase the tendency for re-dissolution, higher analyte purge demand, discoloration of run defects and a high severity of run defects.

Thus, there remains a desire for low density and/or non-settling electrocoating compositions with improved throwing power.

SUMMARY

Aqueous electrocoat compositions having improved throwing power and methods for coating electrically conductive substrates are provided. An exemplary composition includes water, a crosslinkable resin including a binder and a crosslinking agent, and a pigment paste. The exemplary electrocoat composition has a pigment/binder (P/B) ratio of less than about 0.15:1.

In another embodiment, a method for coating an electrically conductive substrate includes dipping the electrically conductive substrate into a bath of an electrocoating composition comprised of water, a crosslinkable resin including a binder and a crosslinking agent, and a pigment paste, wherein the electrocoat composition has a pigment/binder (P/B) ratio of less than about 0.15:1; connecting the substrate as one of the cathode or anode; applying a current to the substrate to deposit a film on the substrate; removing the substrate with the deposited film from the electrodeposition bath; and baking the deposited coating film.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the electrocoat compositions and methods for forming electrocoat compositions as described herein. Furthermore, there is no intention to be bound by any theory presented in the preceding background or summary or in the following detailed description.

As used herein, "a," "an," or "the" means one or more unless otherwise specified. The term "or" can be conjunctive or disjunctive. Open terms such as "include," "including," "contain," "containing" and the like mean "comprising." The term "about" as used in connection with a numerical value throughout the specification and the claims denotes an interval of accuracy, familiar and acceptable to a person skilled in the art. In general, such interval of accuracy is ±ten percent. Thus, "about ten" means nine to eleven. All numbers in this description indicating amounts, ratios of materials, physical properties of materials, and/or use are to be understood as modified by the word "about," except as otherwise explicitly indicated. As used herein, the "%" described in the present disclosure refers to the weight percentage unless otherwise indicated.

An electrocoat composition for coating a substrate is provided herein. The electrocoat composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport.

The electrocoat composition is utilized to form a coating layer on the substrate. Exemplary embodiments herein provide a full electrocoating bath to form a coating layer on a substrate. Certain embodiments utilize epoxy amine based resins or binders that are neutralized with acids to form emulsions.

Exemplary electrocoat compositions described herein have a low pigment to binder weight ratio. Specifically, in the electrocoat compositions described herein, the pigment to binder weight ratio may be less than about 0.17:1, such as less than about 0.15:1 or less than about 0.14:1. Further, in the electrocoat compositions described herein, the pigment to binder weight ratio may be greater than about 0.08:1, such as greater than about 0.085:1, for example greater than about 0.09:1, such as greater than about 0.095:1, for example greater than about 0.098:1, such as greater than about 0.1:1, for example greater than about 0.11:1, such as greater than about 0.12:1, for example greater than about 0.13:1, or greater than about 0.14:1. In exemplary embodiments, the electrocoat composition has a pigment to binder weight ratio of from about 0.1:1 to about 0.15:1.

Further, exemplary electrocoat compositions described herein are low density or non-settling compositions. As used in the industry, the "low density" of a coating composition refers to the dry-film density of a coating or layer deposited by an electrocoating process using the coating composition. In exemplary embodiments, an electrocoated layer formed from the coating compositions described herein may have a dry-film density of less than about 1.5 g/cm$^3$, such as less than about 1.45 g/cm$^3$, for example less than about 1.4 g/cm$^3$, such as less than about 1.35 g/cm$^3$, for example less than about 1.31 g/cm$^3$, such as less than about 1.3 g/cm$^3$, for example less than about 1.29 g/cm$^3$, such as less than about 1.28 g/cm$^3$, for example less than about 1.27 g/cm$^3$, such as less than about 1.26 g/cm$^3$, for example less than about 1.25 g/cm$^3$, such as less than about 1.24 g/cm$^3$, for example less than about 1.23 g/cm$^3$, such as less than about 1.22 g/cm$^3$, for example less than about 1.21 g/cm$^3$, such as less than about 1.20 g/cm$^3$, or less than about 1.19 g/cm$^3$. In certain embodiments, an electrocoated layer formed from the coating compositions described herein may have a dry-film density of greater than about 1.0 g/cm$^3$, such as greater than about 1.1 g/cm$^3$, for example greater than about 1.2 g/cm$^3$. In exemplary embodiments, an electrocoated layer formed from the coating compositions described herein has a total density of from about 1.0 to about 1.5 g/cm$^3$, such as from about 1.2 to about 1.25 g/cm$^3$.

Further, certain embodiments utilize water-soluble polyvinyl alcohol (co)polymer(s) (PVA), i.e., water-soluble polyvinyl alcohol (co)polymer or of a mixture of polyvinyl alcohol (co)polymers, as an additive to improve electrocoating performance. Such PVA may comprise units of the following structure (I)—[—C(R1)2—C(R1)(OH)—]—, wherein each R1 in the structure is independently at least one of hydrogen, an alkyl, a substituted alkyl, a cycloalkyl, a substituted cycloalkyl, alkylcycloalkyl, substituted alkyl-cycloalkyl, cycloalkylalkyl, substituted cycloalkylalkyl, aryl, substituted aryl, alkylaryl, substituted alkylaryl, cycloalkylaryl, substituted cycloalkylaryl, arylalkyl, substituted arylalkyl, arylcycloalkyl, and substituted arylcycloalkyl, wherein at least one of: (i) at least one R1 in the structure is not hydrogen, (ii) the polyvinyl alcohol (co) polymer comprises a reaction product of structure (I) with at least one of a structure (II)—[—C(R1)2—C(R1)(OC(O)R2)—]—, wherein R1 is as previously defined, and R2 is a C1-C10 alkyl; a (meth)acrylic acid ester substantially free from acid groups; a monomer that carry at least one hydroxyl group per molecule and that are substantially free from acid groups; a monomer that carry per molecule at least one acid group that can be converted into a corresponding acid anion group; a vinyl ester of a C5-C18 alpha-branched monocarboxylic acid; a cyclic olefin, an acyclic olefin; (meth)acrylamide; a monomer containing an epoxide group; a vinylaromatic hydrocarbon; a nitrile; a vinyl monomer; and/or an allyl monomer, and/or (iii) the polyvinyl alcohol (co)polymer is a copolymer of vinyl alcohol and at least one ethylenically unsaturated monomer. Exemplary polyvinyl alcohol (co)polymer(s) are described in U.S. Pat. No. 6,951,602, which is herein incorporated by reference.

Heretofore, it was believed that lower P/B ratios as described and claimed herein were not achievable for electrocoat compositions because electrocoat compositions having lower P/B ratios suffered from a lack of stability and weak throwing power. Typically in conventional electrocoating compositions, adequate throwing power could only be achieved with significantly increased bath solids.

Testing of conventional electrocoating compositions with P/B ratios higher than those described and claimed herein confirmed the industry belief that that throw power decreased as the P/B ratio was decreased. For example, a conventional electrocoat composition having a pigment to binder weight ratio of 0.20, i.e., 0.20:1, and a similar electrocoat composition having a pigment to binder weight ratio of 0.12, each with a solids content of 20%, were tested for throwing power. The test was performed according to DIN EN ISO 55655-2 (Paints and varnishes—Electro-deposition paints—Part 2: Throwing power)—28 cm immersion depth/4 mm distance/Film build outside 20-22 micrometers/depending on EPA concentration. With a pigment to binder weight ratio of 0.20, the electrocoat composition exhibited a maximum range of 28 cm for throwing power. With a pigment to binder weight ratio of 0.12, the electrocoat composition exhibited a maximum range of 24 cm for throwing power. Thus, the electrocoating composition with lower pigment to binder weight ratio exhibited worse throwing power performance. Further, with a pigment to binder weight ratio of 0.20, the electrocoat composition exhibited a five micrometer range of 16 cm for throwing power. With a pigment to binder weight ratio of 0.12, the electrocoat composition exhibited a five micrometer range of 15 cm for throwing power. Again, the electrocoating composition with lower pigment to binder weight ratio exhibited worse throwing power performance.

Moreover, it is known that for conventional electrocoating compositions with high pigment to binder weight ratio, the addition of PVA results in worsening throwing power. This effect was confirmed by testing. For example, the test described above was further performed for the conventional electrocoat composition having a pigment to binder weight ratio of 0.20 with increasing amounts of PVA (0 ppm, 100 ppm, and 300 ppm). As noted above, for a composition including 0 ppm PVA, the electrocoat composition exhibited a maximum range of 28 cm for throwing power. At 100 ppm PVA, the electrocoat composition exhibited a maximum range of 26.5 cm for throwing power. At 300 ppm PVA, the electrocoat composition exhibited a maximum range of 25 cm for throwing power. Thus, the testing showed that at the conventional pigment to binder weight ratio of 0.20 the throwing power of the composition decreased as the PVA content was increased. Further, the addition of PVA to the electrocoating composition having a relatively higher level of pigment to binder weight ratio led to the formation of porous and rough layers during electrodeposition.

It has been discovered herein that, despite the reduction in throwing power resulting from a decrease in pigment to binder weight ratio and despite the reduction in throwing power resulting from an increase in PVA, for electrocoat compositions having low pigment to binder weight ratios ("low P/B electrocoat compositions") the addition of PVA actually improves throwing power. For example, the same throwing power test was performed for an electrocoat composition with a solids content of 20% and having a pigment to binder weight ratio of 0.12 while provided with the following amounts of PVA as an additive: 0 ppm, 100 ppm, 300 ppm, and 500 ppm. The test was again performed according to DIN EN ISO 55655-2 (Paints and varnishes—Electro-deposition paints—Part 2: Throwing power)—28 cm immersion depth/4 mm distance/Film build outside 20-22 micrometers/depending on EPA concentration. At 0 ppm (no PVA content), the exemplary low P/B electrocoat composition exhibited a maximum range of 24 cm for throwing power (worse than the throwing power of the comparative high pigment to binder ratio composition). However, at 100 ppm PVA, the exemplary low P/B electrocoat composition exhibited a maximum range of 26 cm for throwing power, and at 300 ppm PVA, the exemplary low P/B electrocoat composition exhibited a maximum range of 27 cm for throwing power. It was not until the PVA content was increased to 500 ppm that the exemplary low P/B electrocoat composition exhibited a decrease in maximum range for throwing power to 25.5 cm. Further, for a range of 5 micrometers, the testing of the exemplary low P/B electrocoat composition revealed a throwing power of 15 cm at 0 ppm, 16 cm at 100 ppm, 18 cm at 300 ppm, and 17 cm at 500 ppm.

Thus, for electrocoating compositions having the lower P/B weight ratio described herein, a significant improvement of throwing power is exhibited by the addition of PVA up to a level of between 100 and 500 ppm, such as at approximately 300 ppm.

Further testing was performed to compare the roughness of an electrodeposited coating formed from the conventional electrocoat composition having a P/B ratio of 0.2 and the exemplary low P/B electrocoat composition having a P/B ratio of 0.12. Testing was performed with a electrocoat composition bath having a solids content of 20%. The conventional high P/B ratio composition had a roughness value (Ra in micrometers) of 0.335 at 0 ppm PVA, 0.36 at 100 ppm PVA, 0.489 at 300 ppm PVA, and 0.642 at 500 ppm PVA. The exemplary low P/B electrocoat composition had a roughness value (Ra in micrometers) of 0.346 at 0 ppm PVA, 0.314 at 100 ppm PVA, 0.393 at 300 ppm PVA, and 0.523 at 500 ppm PVA. Thus, the addition of PVA to the conventional high P/B electrocoat composition caused roughness to increase at each step (worsening the appearance of the coating) while for the low P/B electrocoat composition roughness decreased upon the initial addition of 100 ppm PVA, and remained lower than the comparative roughness measure for the high P/B electrocoat composition at each succeeding increase of PVA.

In other words, it has been found, in contradiction to the conventional understanding, that electrocoat compositions having a low pigment to binder weight ratio (P/B ratio) can exhibit improved throwing power while retaining or improving coating appearance as compared to conventional electrocoat compositions having higher P/B ratios. Such improvement is found for the described exemplary low P/B electrocoat compositions by appearance studies that clearly indicate a positive influence on top-coat appearance by the addition of PVA. Also, it has been found that the addition of PVA to electrocoat compositions having a low pigment to binder weight ratio (P/B ratio) can improve throwing power while retaining or improving coating appearance.

It is noted that a significant reduction of bath circulation could be realized for road wise processes (pendulum) for electrocoat compositions having reduced P/B ratios (e.g., low density or non-settling compositions), as compared to conventional electrocoat compositions having high P/B ratios. Reduction of bath circulation reduces energy consumption and economic savings. Embodiments utilizing weak acid neutralization will have a more environmentally friendly footprint through use of less analyte purge due to the use of weaker acids and less efforts for waste water management when no nitrogen or sulphates are present in the analyte.

Without being bound by the theory, it is believed that the improvement in throwing power and surface appearance is a result of improved electrical isolation characteristics of the film deposited by the low density electrocoating composition having a low pigment/binder (P/B) ratio as described herein. The improved isolation properties could be achieved with PVA-modified electrocoating composition in combination with pigments with low sedimentation tendency, such as carbon black and silica.

An exemplary aqueous cathodic electrocoat composition is formed as an emulsion of the resin, i.e., binder, and neutralizing agent with a dispersion of the pigment paste therein. As described herein, compositions and methods may use acids having a higher pKa, i.e., mild acids, than the strong acids conventionally used in the neutralizing agent. Such weaker acids may include formic acid, DMPA, lactic acid, and acetic acid. As is well known, the pKa value is used to indicate the strength of an acid. pKa is the negative log of the acid disassociation constant, or Ka value. A lower pKa value indicates a stronger acid. That is, the lower the value, the more the acid fully dissociates in water. Of the currently used strong acids, sulfamic acid has a pKa value of −1.05, nitric acid has a pKa of −1.4, and MSA has a pKa of −1.9. The mild acids of embodiments disclosed herein include formic acid with a pKa of 3.75, DMPA with a pKa of 4, lactic acid with a pKa of 3.85, and acetic acid with a pKa of 4.76.

It is believed that these identified mild acids provide for slower and less defective deposition on areas with high current density, such as at sharp edges, and for improved stabilization of bismuth catalyst.

As is further described, compositions and methods described herein further utilize isolating extenders or pigments in conjunction with the milder acids. The combined effect of using milder acids and isolating extenders or pigments has been found to lead to positive contribution on the substrate isolation and build up of wet film resistance in order to achieve improved film build distribution and throwing power.

In certain embodiments, the neutralizing agent has a pKa value of greater than about 0.5. For example, an exemplary neutralizing agent has a pKa value of greater than about 1, such as greater than about 1.5, or greater than about 2. In certain embodiments, the neutralizing agent has a pKa value of greater than about 2.5. For example, an exemplary neutralizing agent has a pKa value of greater than about 3, such as greater than about 3.5, or greater than about 3.7. In an exemplary embodiment, the neutralizing agent has a pKa value of from about 3.7 to about 8. In certain embodiments, the neutralizing agent has a pKa value of less than about 8. For example, an exemplary neutralizing agent has a pKa value of less than about 7, such as less than about 6, or less than about 5. In certain embodiments, the neutralizing agent has a pKa value of less than about 4.8. For example, an exemplary neutralizing agent has a pKa value of from about 3.7 to about 4.8.

In exemplary embodiments, the neutralizing agent is substantially free of acids having a pKa value of less than 3.7. In certain embodiments, the neutralizing agent is substantially free of acids having a pKa value of less than about 3.5. For example, an exemplary neutralizing agent is substantially free of acids having a pKa value of less than about 3, such as less than about 2.5, or less than about 2. In certain embodiments, the neutralizing agent is substantially free of acids having a pKa value of less than about 1.5. For example, an exemplary neutralizing agent is substantially free of acids having a pKa value of less than about 1, such as less than about 0.5, or less than about 0.

In exemplary embodiments, an emulsion is formed from the resin and neutralizing agent, and a dispersion therein is formed by the pigment paste. In such embodiments, an exemplary emulsion (not including the dispersion of pigment paste) is substantially free of acids having a pKa value of less than about 3.7. In certain embodiments, the neutralizing agent is substantially free of acids having a pKa value of less than about 3.5. For example, an exemplary neutralizing agent is substantially free of acids having a pKa value of less than about 3, such as less than about 2.5, or less than about 2. In certain embodiments, the neutralizing agent is substantially free of acids having a pKa value of less than about 1.5. For example, an exemplary neutralizing agent is substantially free of acids having a pKa value of less than about 1, such as less than about 0.5, or less than about 0.

As used herein, a neutralizing agent (or emulsion) that is "substantially free" of delineated acids, may be completely free of the delineated acids, i.e., contain less than the detectable level of the delineated acids, or may include less than 10 mol percent of the delineated acids in relation to the total acid content in the neutralizing agent (or emulsion). For example, a neutralizing agent (or emulsion) that is substantially free of acids having a pKa value of less than about 3.7 may include up to about 10 mol percent of acids having a pKa value of less than about 3.7 and at least 90 mol percent of acids having a pKa value of about 3.7 or greater than about 3.7. In certain embodiments, a neutralizing agent (or emulsion) that is "substantially free" of delineated acids, may include less than 1 mol percent of the delineated acids in relation to the total acid content in the neutralizing agent (or emulsion).

In exemplary embodiments, the neutralizing agent is selected from the group of acids having a pKa value of greater than about 3.7. In certain embodiments, the neutralizing agent is selected from the group consisting of formic acid, dimethylolpropionic acid (DMPA), lactic acid, and acetic acid, and combinations thereof. For example, the neutralizing agent may comprise formic acid, DMPA, lactic acid, and/or acetic acid. In certain embodiments, the neutralizing agent may consist of formic acid, DMPA, lactic acid, and acetic acid. In other embodiments, the neutralizing agent may consist of three acids selected from formic acid, DMPA, lactic acid, and acetic acid. Another exemplary neutralizing agent may consist of two acids selected from formic acid, DMPA, lactic acid, and acetic acid. Certain exemplary neutralizing agents may consist of formic acid. Other exemplary neutralizing agents may consist of DMPA. Still other exemplary neutralizing agents may consist of lactic acid. Yet other exemplary neutralizing agents may consist of acetic acid.

An exemplary aqueous cathodic electrocoat composition is formed as an emulsion of the resin, i.e., binder, and neutralizing agent with a dispersion of the pigment paste therein. In certain embodiments, the emulsion includes less than about 60 millimoles (mmol) of the neutralization agent per hundred grams of solids in the emulsion; such as less than 50 mmol, for example less than 40 mmol, or less than 35 mmol, of the neutralization agent per hundred grams of solids in the emulsion. In certain embodiments, the emulsion includes greater than about 10 millimoles (mmol) of the neutralization agent per hundred grams of solids in the emulsion; such as greater than 15 mmol, for example greater than 20 mmol, greater than 25 mmol or greater than 30 mmol, of the neutralization agent per hundred grams of solids in the emulsion.

Any suitable ratio of acids in the neutralization agent may be utilized. For example, the neutralization agent may have a (formic acid):(DMPA):(lactic acid):(acetic acid) ratio of about (2 to 4):(3 to 4):(1 to 3):(20 to 30).

Any suitable amounts of specific acids in total acid content (100 mol %) of the neutralization agent may be utilized. In an exemplary embodiment, the neutralization agent includes from about 2.5 to about 20 mol % formic acid, such as from about 5 to about 15 mol % formic acid, for example from about 7.5 to about 12.5 mol % formic acid, or from about 8 to about 10 mol % formic acid. In an exemplary embodiment, the neutralization agent includes from about 5 to about 20 mol % DMPA, such as from about 7.5 to about 15 mol % DMPA, for example from about 10 to about 12 mol % DMPA. In an exemplary embodiment, the neutralization agent includes from about 1 to about 20 mol % lactic acid, such as from about 2 to about 15 mol % lactic acid, for example from about 5 to about 10 mol % lactic acid, or from about 6 to about 8 mol % lactic acid. In an exemplary embodiment, the neutralization agent includes from about 50 to about 90 mol % acetic acid, such as about 60 to about 90 mol % acetic acid, for example from about 65 to about 80 mol % acetic acid, or from about 70 to about 75 mol % acetic acid.

In an exemplary embodiment, after formation of the emulsion from the resin and neutralizing agent, the emulsion may include, based on 100 grams of solids in the emulsion, from about 20 to about 60, such as from about 25 to about 45, for example from about 30 to about 35, or from about 32 to about 34 millimoles (mmol) of acid from the neutralizing agent. In certain embodiments, the emulsion includes less than about 60 mmol of the neutralization agent per hundred grams of solids in the emulsion; such as less than 50 mmol, for example less than 40 mmol, or less than 35 mmol, of the neutralization agent per hundred grams of solids in the emulsion. In certain embodiments, the emulsion includes greater than about 10 mmol of the neutralization agent per hundred grams of solids in the emulsion; such as greater than 15 mmol, for example greater than 20 mmol, greater than 25 mmol or greater than 30 mmol, of the neutralization agent per hundred grams of solids in the emulsion.

In an exemplary embodiment, after formation of the emulsion from the resin and neutralizing agent, the emulsion may include, based on 100 grams of solids in the emulsion, from about 1 to about 6, such as from about 2 to about 4, for example from about 2.3 to about 3.5, or from about 2.8 to about 3.2 mmol formic acid; from about 1 to about 10, such as from about 2 to about 6, for example from about 3 to about 5, or from about 3.5 to about 4 mmol DMPA; from about 0.5 to about 6, such as from about 1 to about 4, for example from about 1.5 to about 3, or from about 2 to about 2.5 mmol lactic acid; and from about 10 to about 40, such as from about 15 to about 30, for example from about 20 to about 28, or from about 23 to about 25 mmol acetic acid.

In an exemplary embodiment, the emulsion comprises from about 1 to about 5 mmol of formic acid per 100 grams of solids; from about 1 to about 5 mmol of DMPA per 100 grams of solids; from about 1 to about 5 mmol of lactic acid per 100 grams of solids; and from about 20 to about 30 mmol of acetic acid per 100 grams of solids. For example, an exemplary emulsion comprises from about 2.5 to about 3.5 mmol of formic acid per 100 grams of solids; from about 3 to about 4 mmol of DMPA per 100 grams of solids; from about 2 to about 3 mmol of lactic acid per 100 grams of solids; and from about 22 to about 26 mmol of acetic acid per 100 grams of solids.

In an exemplary embodiment, an epoxy amine based emulsion is formed by neutralizing a conventional crosslinkable resin comprising a binder and a crosslinking agent. Preparation of such a resin is known in the previous arts, such as in U.S. Pat. No. 6,207,731, which is incorporated by reference. Herein, such resin is neutralized with a neutralizing agent of mild acids including formic acid, dimethylolpropionic acid (DMPA), lactic acid, and acetic acid. The resulting emulsion contains 3.0 mmol of formic acid per hundred grams of solids, 3.7 mmol of DMPA per hundred grams of solids, 2.3 mmol of lactic acid per hundred grams of solids, and 24.5 mmol of acetic acid per hundred grams of solids, for a total of 33.5 mmol of neutralizing acids per hundred grams of solids in the emulsion. In an exemplary embodiment, the solid content of the emulsion is from about 35 to about 40%.

The electrocoat composition may be described herein as an aqueous dispersion. The term "dispersion" as used within the context herein is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general may not be critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

As compared to conventional aqueous cathodic electrocoat composition formed from strong neutralizing acids, an aqueous cathodic electrocoat composition formed from the above described neutralizing agents exhibited improved edge protection by about 10% under testing, i.e., surface damage was reduced by 10%. Further, an aqueous cathodic electrocoat composition formed from the above described neutralizing agents and the addition of silica exhibited improved edge protection by about 25% under testing. Adding both the described amounts of silica and barium sulfate to an aqueous cathodic electrocoat composition formed from the above described neutralizing agents led to an improvement over the conventional aqueous cathodic electrocoat composition formed from strong neutralizing acids by about 50%.

In certain embodiments of the aqueous cathodic electrocoat composition, the pigment paste includes silica, barium sulfate, titanium oxide, and/or carbon black. In certain embodiments, the pigment paste may comprise, based on a total pigment paste weight, at least about 1 wt % silica, such as at least about 5 wt %, for example at least about 10 wt %, or at least about 15 wt % silica. An exemplary pigment paste comprises, based on a total pigment paste weight, at least about 20 wt % silica, such as at least about 25 wt %, for example at least about 30 wt % silica. An exemplary pigment paste comprises, based on a total pigment paste weight, no more than about 40 wt % silica, such as no more than about 35 wt %, for example no more than about 30 wt %, or no more than about 25 wt % silica. Further, an exemplary pigment paste comprises, based on a total pigment paste weight, no more than about 20 wt % silica, such as no more than about 15 wt %, for example no more than about 10 wt % silica.

In certain embodiments, the pigment paste may comprise, based on a total pigment paste weight, at least about 0.1 wt % carbon black, such as at least about 0.2 wt %, for example at least about 0.3 wt %, or at least about 0.4 wt % carbon black. An exemplary pigment paste comprises, based on a total pigment paste weight, at least about 1 wt % carbon black, such as at least about 2 wt %, for example at least about 3 wt % carbon black. An exemplary pigment paste comprises, based on a total pigment paste weight, no more than about 1 wt % carbon black, such as no more than about 0.7 wt %, for example no more than about 0.5 wt %, or no more than about 0.4 wt % carbon black. Further, an exemplary pigment paste comprises, based on a total pigment paste weight, no more than about 10 wt % carbon black, such as no more than about 7 wt %, for example no more than about 5 wt % carbon black.

In certain embodiments, the pigment paste may comprise, based on a total pigment paste weight, at least about 2 wt % titanium oxide, such as at least about 5 wt %, for example at least about 10 wt %, or at least about 12 wt % titanium oxide. An exemplary pigment paste comprises, based on a total pigment paste weight, no more than about 30 wt % titanium oxide, such as no more than about 25 wt %, for example no more than about 20 wt %, or no more than about 15 wt % titanium oxide.

In certain embodiments, the pigment paste may comprise, based on a total pigment paste weight, at least about 0.5 wt % barium sulfate, such as at least about 1 wt %, for example at least about 2 wt %, at least about 5 wt % barium sulfate, or at least about 10 wt % barium sulfate. An exemplary pigment paste comprises, based on a total pigment paste weight, no more than about 40 wt % barium sulfate, such as no more than about 35 wt %, for example no more than about 20 wt %, no more than about 15 wt % barium sulfate, no more than about 10 wt % barium sulfate or no more than about 8 wt % barium sulfate.

An exemplary pigment paste is a low density pigment paste and, in certain embodiments, may be for use in a non-settling electrocoat composition. For example, the pigment paste may provide a dry-film density of less than about 1.5 g/cm$^3$, such as less than about 1.45 g/cm$^3$, for example less than about 1.4 g/cm$^3$, such as less than about 1.35 g/cm$^3$, for example less than about 1.31 g/cm$^3$, such as less than about 1.3 g/cm$^3$, for example less than about 1.29 g/cm$^3$, such as less than about 1.28 g/cm$^3$, for example less than about 1.27 g/cm$^3$, such as less than about 1.26 g/cm$^3$, for example less than about 1.25 g/cm$^3$, such as less than about 1.24 g/cm$^3$, for example less than about 1.23 g/cm$^3$, such as less than about 1.22 g/cm$^3$, for example less than about 1.21 g/cm³, such as less than about 1.20 g/cm³, or less than about 1.19 g/cm³. In certain embodiments, the pigment paste may provide a dry-film density of greater than about 1.0 g/cm³, such as greater than about 1.1 g/cm³, for example greater than about 1.2 g/cm³. In exemplary embodiments, the pigment paste may provide a dry-film density of from about 1.0 to about 1.5 g/cm³, such as from about 1.2 to about 1.25 g/cm³.

It is noted that the consumption of the electrocoat composition during an electrocoating process, i.e., during the formation of an electrocoated layer or film, is governed by the equation: Electrocoat consumption=Surface Area (m²) *film build (μm)*dry-film density (g/cm³). Thus, a reduction in dry-film density provides for a reduction in electrocoat composition consumption.

In an exemplary embodiment, the pigment paste includes a functional extender, such as silica. For embodiments which are not indicated for electrocoat compositions exhibiting improved non-settling properties, the pigment paste may not include silica.

Further, in an exemplary embodiment, a black pigment paste is formed from the following components, based on a total weight of the pigment paste:
Demineralized water: about 40 to about 50 wt. %;
Acid: about 0 to about 2 wt %;
Grind resin: about 5 to about 15 wt %, such as about 9 to about 12 wt %;
Defoamer: about 0 to about 2 wt %;
Wetting agents: about 0 to about 2 wt %;
Silica: about 30 to about 40 wt %;
Carbon black: about 3 to about 5 wt %;
Organic solvents: about 5 to about 15 wt %, such as about 8 to about 12 wt %;
EPA: about 0 to about 1.5 wt %, such as about 0.5 to about 1.0 wt %.

In an exemplary embodiment, a grey pigment paste is formed from the following components, based on a total weight of the pigment paste: Demineralized water: about 25 to about 35 wt. %;
Acid: about 0 to about 2 wt %;
Grind resin: about 10 to about 20 wt %, such as about 12 to about 16 wt %;
Defoamer: about 0 to about 2 wt %;
Wetting agents: about 0 to about 2 wt %;
Titanium oxide (TiO₂): about 10 to about 20 wt %, such as about 12 to about 15 wt %;
Barium sulfate (BaSO₄): about 1 to about 35 wt %, such as about 2 to about 8 wt %;
Silica: about 0 to about 30 wt %, such as about 15 to about 25 wt %;
Carbon black: about 0.1 to about 0.5 wt %;
Organic solvents: about 3 to about 10 wt %, such as about 3 to about 5 wt %;
EPA: about 1 to about 100 parts per million (ppm).

In an exemplary embodiment, the materials for forming the pigment paste were mixed in suitable container until a homogeneous mixture formed. The mixture may be later dispersed by charging into an Eiger mill. In an exemplary embodiment, the solid content of the pigment paste is about 20 to about 80%, such as about 30 to about 60%, for example about 40 to about 50%.

In certain embodiments, the pigment paste is prepared by grinding or dispersing a pigment into a grinding vehicle and optional ingredients such as wetting agents, surfactants, and defoamers. Any of the pigment grinding vehicles that are well known in the art can be used or the novel additive described above can be used. After grinding, the particle size of the pigment should be as small as practical, generally, the particle size is about 6-8 using a Hegman grinding gauge.

Pigments which can be used in embodiments described herein may also include basic lead silicate, aluminum silicate, strontium chromate, iron oxide, clay and the like. Pigments with high surface areas and oil absorbencies should be used judiciously because these can have an undesirable affect on coalescence and flow of the electrodeposited coating.

In certain embodiments, the pigment paste includes an anti-corrosive pigment or blends of anticorrosive pigments. Exemplary anti-corrosive pigments include metallic chromates, phosphates, phosphites, borates, borosilicates, phosphosilicates, molybdates, oxides, and rare earth compounds. Organic anticorrosive agents may optionally also be present; they include benzotriazoles, morpholines, azoles, calcium alkyl-aryl sulfonates, diamines, and metal salts of dinonylnapathalene sulfonates.

Typically, the pigment paste is packaged and delivered separately from the emulsion. When desired for use, the pigment paste is blended into the emulsion to form an electrocoat composition having a pigment dispersion therein. In the electrocoat composition, the pigment to binder weight ratio may be less than about 0.17:1, such as less than about 0.15:1 or less than about 0.14:1. Further, the pigment to binder weight ratio may be greater than about 0.01:1, such as greater than about 0.05:1, for example greater than about 0.09:1, such as greater than about 0.1:1. In exemplary embodiments, the electrocoat composition has a pigment to binder weight ratio of from about 0.01:1 to about 0.15:1, such as from about 0.1 to about 0.14:1.

Further, in an exemplary embodiment, the electrocoat composition has a relatively low level of bath solids. For example the electrocoat composition may have a solids content of less than about 50 wt %, such as less than about 45 wt %, less than about 40 wt %, less than about 35 wt %, less than about 30 wt %, less than about 25 wt %, or less than about 20 wt %. Generally, the electrocoat composition may have a solids content of greater than about 3 wt %, greater than about 5 wt %, greater than about 10 wt %, greater than about 15 wt %, greater than about 20 wt %, greater than about 25 wt %, greater than about 30 wt %, greater than about 35 wt %, or greater than about 40 wt %. In an exemplary embodiment, the electrocoat composition has a solids content of from about 15% to about 25%, such as from about 18% to about 22%. In another exemplary embodiment, the electrocoat composition has a solids content of from about 35 to about 40%.

The electrocoat compositions can contain optional ingredients such as wetting agents, surfactants, defoamers, and plasticizers.

The electrocoat composition may be described herein as an aqueous dispersion. The term "dispersion" as used within the context herein is believed to be a two-phase translucent or opaque aqueous resinous binder system in which the binder is in the dispersed phase and water the continuous phase. The average particle size diameter of the binder phase may be about 0.1 to 10 microns, such as less than 5 microns. Generally, the major portion of the aqueous dispersion is water. In an exemplary embodiment, the electrocoat composition has a solids content of from about 3 to 50 percent, such as from about 5 to 40 percent by weight binder solids. Aqueous binder concentrates which are to be further diluted with water when added to an electrocoating bath, generally have a range of binder solids of 10 to 30 percent weight.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An aqueous electrocoat composition comprising:
   water;
   a crosslinkable resin including a binder and a crosslinking agent;
   a pigment paste;
   a neutralizing agent for neutralizing the binder, wherein the neutralizing agent comprises at least one acid selected from the group consisting of formic acid, dimethylolpropionic acid (DMPA), lactic acid, and acetic acid, wherein the neutralizing agent has a pKa value of from 3.7 to 4.8 and is substantially free of acids having a pKa value of less than 3.7; and
   a water-soluble polyvinyl alcohol (PVA) (co)polymer(s), wherein the composition comprises from 100 to about 300 ppm (parts per million) of the water-soluble polyvinyl alcohol (co)polymer(s),
   wherein the electrocoat composition has a pigment/binder (P/B) ratio of less than 0.15:1, and
   wherein the electrocoat composition, when tested according to DIN EN ISO 55655-2 with a 28 cm immersion depth, 4 mm distance, and film build outside 20-22 micrometers, exhibits a maximum throwing power range of at least 26 cm.

2. The composition of claim 1 wherein the pigment/binder (P/B) ratio is from 0.01:1 to 0.14:1, and wherein the composition comprises 100 to 300 ppm (parts per million) of the water-soluble polyvinyl alcohol (co)polymer.

3. The composition of claim 1 wherein the pigment/binder (P/B) weight ratio is from 0.1:1 to 0.13:1, and wherein the composition comprises 100 to 300 ppm (parts per million) of the water-soluble polyvinyl alcohol (co)polymer.

4. The composition of claim 3 wherein the composition comprises from 100 to 200 ppm (parts per million) of the water-soluble polyvinyl alcohol (co)polymer(s).

5. The composition of claim 1 wherein the pigment/binder (P/B) weight ratio is from 0.1:1 to 0.13:1, and wherein the composition comprises 100 to 200 ppm (parts per million) of the water-soluble polyvinyl alcohol (co)polymer.

6. The composition of claim 1 wherein the composition comprises about 300 ppm (parts per million) of the water-soluble polyvinyl alcohol (co)polymer(s).

7. The composition of claim 1 wherein the pigment paste comprises 15 to 25 wt % silica, based on the total weight of the pigment paste.

8. The composition of claim 1 wherein the composition provides a dry-film density of a coating deposited by an electrocoating process using the composition of from 1.2 to 1.3 $g/cm^3$.

9. The composition of claim 1 wherein the composition provides a dry-film density of a coating deposited by an electrocoating process using the composition of from 1.2 to 1.28 $g/cm^3$.

10. The composition of claim 1 wherein the composition provides a dry-film density a coating deposited by an electrocoating process using the composition of from 1.2 to 1.25 $g/cm^3$.

11. An aqueous electrocoat composition comprising:
    water;
    a crosslinkable resin including a binder and a crosslinking agent;
    a pigment paste; and
    a water-soluble polyvinyl alcohol (PVA) (co)polymer(s), wherein the composition comprises from 100 to 300 ppm (parts per million) of the water-soluble polyvinyl alcohol (co)polymer(s),
    wherein the electrocoat composition has a pigment/binder (P/B) ratio of less than 0.15:1, and
    wherein the electrocoat composition, when tested according to DIN EN ISO 55655-2 with a 28 cm immersion depth, 4 mm distance, and film build outside 20-22 micrometers, exhibits a maximum throwing power range of at least 26 cm.

12. The composition of claim 11 wherein the pigment/binder (P/B) ratio is from 0.01:1 to 0.14:1.

13. The composition of claim 11 wherein the pigment/binder (P/B) weight ratio is from 0.1:1 to 0.13:1.

14. The composition of claim 11 wherein the composition comprises about 300 ppm (parts per million) of the water-soluble polyvinyl alcohol (co)polymer(s).

15. The composition of claim 11 wherein the composition comprises 100 to 200 ppm (parts per million) of the water-soluble polyvinyl alcohol (co)polymer(s).

16. The composition of claim 11 wherein the pigment/binder (P/B) weight ratio is from 0.1:1 to 0.13:1, and wherein the composition comprises about 300 ppm (parts per million) of the water-soluble polyvinyl alcohol (co)polymer(s).

* * * * *